United States Patent
Ratajczak et al.

(10) Patent No.: US 12,170,407 B2
(45) Date of Patent: Dec. 17, 2024

(54) FULL-DUPLEX, MULTI-ANTENNA WIRELESS COMMUNICATION DEVICE AND METHOD FOR CONTROLLING SUCH A DEVICE

(71) Applicant: Orange, Issy-les-Moulineaux (FR)

(72) Inventors: Philippe Ratajczak, Châtillon (FR); Dinh Thuy Phan Huy, Châtillon (FR); Dominique Barthel, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 164 days.

(21) Appl. No.: 18/002,962

(22) PCT Filed: Jun. 22, 2021

(86) PCT No.: PCT/FR2021/051133
§ 371 (c)(1),
(2) Date: Dec. 22, 2022

(87) PCT Pub. No.: WO2021/260317
PCT Pub. Date: Dec. 30, 2021

(65) Prior Publication Data
US 2023/0344150 A1 Oct. 26, 2023

(30) Foreign Application Priority Data
Jun. 25, 2020 (FR) ...................... 2006651

(51) Int. Cl.
*H01Q 21/24* (2006.01)
*H04B 7/04* (2017.01)
(Continued)

(52) U.S. Cl.
CPC ....... *H01Q 21/245* (2013.01); *H04B 7/04013* (2023.05); *H04B 7/0617* (2013.01); *H04B 7/086* (2013.01)

(58) Field of Classification Search
CPC ............. H01Q 21/245; H04B 7/04013; H04B 7/0617; H04B 7/086
See application file for complete search history.

(56) References Cited

U.S. PATENT DOCUMENTS

2017/0180160 A1* 6/2017 Moorti ................ H04L 27/2651

OTHER PUBLICATIONS

International Search Report and Written Opinion dated Aug. 26, 2021 for Application No. PCT/FR2021/051133.
(Continued)

*Primary Examiner* — Henry Luong
(74) *Attorney, Agent, or Firm* — Knobbe, Martens, Olson & Bear, LLP

(57) ABSTRACT

A wireless communication device having a full-duplex architecture is described, the device comprising phase shifters integrated into transmitting chains and receiving chains, respectively, which are connected to basic antennae. Each transmitting/receiving chain is associated with a receiving/transmitting chain so as to form a pair of chains, with a connection circuit arranged between the chains of each pair. The device also includes at least one control module configured to control switching means and to activate/deactivate analogue means and digital means for cancelling interference and all or some of the transmitting/receiving chains so that the device is able to alternate between at least two different modes: a first full-duplex transmitting/receiving mode, and a second mode in which the device is able to reflect one or more transmission beams.

12 Claims, 5 Drawing Sheets

(51) Int. Cl.
  *H04B 7/06* (2006.01)
  *H04B 7/08* (2006.01)

(56) References Cited

OTHER PUBLICATIONS

Liu et al. "Deep Denoising Neural Network Assisted Compressive Channel Estimation for mm Wave Intelligent Reflecting Surfaces" arxiy.org, Cornell University Library, 201 Olin Library Cornell University Ithaca, NY 14853, Jun. 3, 2020 (Jun. 3, 2020).

Taha et al. "Deep Learning for Large Intelligent Surfaces in Millimeter Wave and Massive MIMO Systems" 2019 IEEE Global Communications Conference (Globecom), IEEE, Dec. 9, 2019 (Dec. 9, 2019), pp. 1-6.

Sabharwal et al. "In-Band Full-Duplex Wireless: Challenges and Opportunities" IEEE Journal on Selected Areas in Communications, US, vol. 32, No. 9, Sep. 1, 2014 (Sep. 1, 2014), pp. 1637-1652.

* cited by examiner

FULL-DUPLEX, MULTI-ANTENNA WIRELESS COMMUNICATION DEVICE AND METHOD FOR CONTROLLING SUCH A DEVICE

RELATED APPLICATIONS

This application is the U.S. National Phase of Application No. PCT/FR2021/051133 entitled "FULL-DUPLEX, MULTI-ANTENNA WIRELESS COMMUNICATION DEVICE AND METHOD FOR CONTROLLING SUCH A DEVICE" and filed Jun. 22, 2021, which claims the benefit of French Patent Application No. 2006651, filed Jun. 25, 2020, each of which is incorporated by reference in its entirety.

PRIOR ART

The present invention belongs to the general field of telecommunications, and in particular wireless communications implemented on radio—type networks such as mobile networks (e.g. 3G, 4G, 5G, etc.), Wi-Fi, etc. It relates more particularly to a wireless communication device including an array of antenna elements, said device having an architecture configured to emit and receive transmission beams via said antenna elements. It also relates to a method for controlling the operation of such a device, as well as a communication method implemented by a wireless communication system including such a device.

The invention finds a particularly advantageous application, although without limitation, in the case of a wireless communication device of the MIMO (Multiple Input Multiple Output) type using several antennas in emission and in reception, and in particular in the case of a massive MIMO type wireless communication device based on a large number of antennas (typically from 16 to 128 antennas, this number being likely to increase in the future).

In order to adapt to the continuous and ever faster growth of the data traffic emitted by the wireless communication systems, different technologies are now being implemented, and are still being improved with a view to optimal use in the years to come.

Among these technologies, and more particularly in the context of MIMO-type wireless communication systems, it is known to configure a wireless communication device, such as a base station or a mobile telephone, for the purpose of simultaneously emitting and/or receiving several data streams via an array of antennas (i.e. a set of antenna elements) equipping said wireless communication device. Advantageously, these data streams are conveyed by directional transmission beams (also called beamforming) formed for this purpose. The use of such beams thus allows the wireless communication device to deliver or receive data with high spectral efficiency as well as with a high flow rate.

These performances can be further improved via the use of surfaces called "Intelligent Surfaces", which are often large-sized, as has been proposed recently.

In its general principle, such an intelligent surface is essentially composed of antennas connected to passive phase-shifters that are controlled to allow said antennas to reflect incident signals (e.g. transmission beams) in a preferred direction. Consequently, when such an intelligent surface is positioned in the environment of two wireless communication devices, one acting as an emitter and the other acting as a receiver, it allows increasing the flow rate between these latter by creating a propagation channel conducive to better reflection towards the receiving device that receives incident signals coming from the emitting device. Examplary implementations of such an intelligent surface are for example described in the document: "Deep Learning for Large Intelligent Surfaces in Millimeter Wave and Massive MIMO Systems", A. Taha, M. Alrabeiah, A. Alkhateeb, Proc. IEEE Globecom 2019, 9-13 Dec. 2019, Hawaii, USA.

It should furthermore be noted that the use of an intelligent surface is particularly advantageous when an obstacle prevents, or at least complicates, the establishment of a communication between an emitting device and a receiving device. By way of illustration, it may be a wall positioned between these latter, an intelligent surface allowing them to communicate with each other by "bypassing" this wall.

However, the implementation of an intelligent surface remains problematic to this day, mainly for reasons of complexity and cost. Indeed, the effective controlling of a large number of passive phase-shifters turns out to be a difficult task, at least with regard to the electronics to be deployed as well as the algorithmic and signal processing aspects to be implemented. Furthermore, the fact of integrating an element (i.e. the intelligent surface) in addition to the elements initially forming a wireless communication system (i.e. emitting devices and receiving devices) requires significant expenditure, thus contributing to making the use of an intelligent surface an expensive communication solution.

DISCLOSURE OF THE INVENTION

The present invention aims to overcome all or part of the drawbacks of the prior art, in particular those set out above, by proposing a solution that allows improving the performances of a wireless communication system in a simpler and less expensive manner than the solutions of the prior art implementing an intelligent surface.

To this end, and according to a first aspect, the invention relates to a wireless communication device having an architecture configured to emit and receive transmission beams in full-duplex mode via an array of antenna elements and including passive phase-shifters distributed according to a first set and a second set, said phase-shifters each including a first port and a second port, the phase-shifters of the first set/second set being respectively connected, via their first ports, to power/low-noise amplifiers of emission/reception chains connected to said antenna elements, each emission/reception chain being associated with a reception/emission chain so as to form a pair of chains, a junction circuit being arranged between the chains of each pair of chains. Said device further includes at least one controlling module configured to control switching means of said device and to activate/deactivate analog and digital interference cancellation means of said device as well as all or part of the emission and reception chains, so that the device is able to alternate between at least two distinct modes:

a first mode in which the cancellation means as well as the emission and reception chains are activated, the phase-shifters being connected to their respective chains via their second port, a second mode in which the chains, apart from their respective amplifiers, are deactivated, the second port of a phase-shifter integrated into a chain of a pair of chains being connected, via the junction circuit associated with said pair, to the second port of the phase-shifter integrated into the other chain of said pair.

Thus, there is proposed a wireless communication device on the one hand having a full-duplex architecture, and on the other hand configured in software and hardware to reflect one or several transmission beams in a direction that can be controlled thanks to the passive phase-shifters.

The advantages proposed by such a full-duplex architecture lie in particular in the fact that the wireless communication device according to the invention is able to simultaneously emit and receive signals in a frequency band associated therewith. Such dispositions advantageously allow avoiding having to load multiple frequency bands, which are rare resources, on the one hand to emit and on the other hand to receive signals, thus improving the spectral efficiency of said device.

In general, those skilled in the art can refer to the following document for more details regarding the implementation of a full-duplex architecture: "In-Band Full-Duplex Wireless: Challenges and Opportunities", A. Sabharwal, P. Schniter, D. Guo, D. W. Bliss, S. Rangarajan, R. Wichman, IEEE Journal of Selected Areas in Communications, vol. 32, No. 9, pp. 1637-1652, September 2014.

The passive phase-shifters integrated into the full-duplex architecture of the communication device according to the invention allow conventionally, depending on how they are configured, controlling the direction in which the transmission beams that can be emitted or received by the array of antenna elements are preferably oriented. However, the invention is not limited to such use of said passive phase-shifters.

Indeed, each passive phase-shifter is also used to allow connecting together, according to said second operating mode of the wireless communication device, emission and reception chains in pairs. In this manner, in this second operating mode, the energy transported by a signal and received at the level of an antenna element follows a path forming a loop, due to the link between chains and thanks to the junction circuit, so to be able to be redirected in the direction of the same antenna element (or possibly of another antenna element) and thus be reflected.

Consequently, when the passive phase-shifters are configured in an appropriate manner, the communication device according to the invention behaves like an intelligent surface, since a signal received by it can be reflected in a chosen direction. Such dispositions allow the communication device according to the invention to improve any communications between other communication devices, as proposed by the intelligent surfaces (increase in the flow rate, circumvention of an obstacle).

The modifications to be envisaged to make a communication device according to the invention from a traditional device having a full-duplex architecture are also inexpensive. Indeed, the implementation of components such as appropriate switching means can be achieved at lower cost, these components being very easily accessible.

The invention is also particularly advantageous insofar as the communication device according to the invention can take the form of a piece of equipment already present in the environment of a communication network. By way of example, it can be a mobile terminal, a base station, etc. In other words, by configuring according to the dispositions of the invention a traditional communication device having a full-duplex architecture, it is not necessary to use, as done in the state of the art, intelligent surfaces that are costly and complex to implement.

The invention therefore allows taking advantage of the advantages provided by a full-duplex architecture as well as by an intelligent surface, by avoiding the actual implementation of such a surface in a communication network. In this manner, the invention offers the possibility of improving the communications in a communication network, in a simple and inexpensive manner.

In particular embodiments, the wireless communication device may further include one or several of the following characteristics, taken in isolation or in all technically possible combinations.

In particular embodiments, the switching means include, for each passive phase-shifter, an inverter configurable according to two configurations:
- a first configuration in which said inverter connects the second port of said phase-shifter to the chain into which said phase-shifter is integrated,
- a second configuration in which said inverter connects the second port of said phase-shifter to the junction circuit associated with the pair of chains comprising the chain into which said phase-shifter is integrated.

Such dispositions refer to a first embodiment of the switching means, and are particularly simple and inexpensive to implement.

It should be noted that the alternation between the operating modes of the communication device implies that, in the first embodiment of the switching means, the inverters respectively associated with the phase-shifters integrated into the emission chains (respectively into the reception chains) are jointly piloted so as to be all in the same configuration at the same time when the communication device is in a given operating mode. It is therefore understood that the inverters respectively associated with the phase-shifters integrated into the emission chains (respectively into the reception chains) form a multipole inverter.

In particular embodiments, the switching means include, for each passive phase-shifter, a first inverter and a second inverter connected to respective transmission lines mounted in parallel and joining at the level of a connection point to which the second port of said phase-shifter is connected, each inverter being configurable according to two configurations, a first configuration in which:
- the first inverter connects said connection point to the chain into which said phase-shifter is integrated,
- the second inverter connects said connection point to a first impedance matching circuit, as well as a second configuration in which:
- the first inverter connects said connection point to a second impedance matching circuit separate from said first impedance matching circuit,
- the second inverter connects said connection point to the junction circuit associated with the pair of chains comprising the chain into which said phase-shifter is integrated. Moreover, said first impedance circuit (respectively the second impedance circuit) is configured to create an open circuit at the level of the connection point when the second inverter (respectively the first inverter) is configured in its first configuration (respectively in its second configuration).

Such dispositions refer to a second embodiment of the switching means, as an alternative to the first embodiment mentioned above for the switching means.

By thus creating a "true" open circuit at the level of the connection point according to the configurations of the inverters, said impedance circuits allow compensating for the effects of an open stub.

By "open stub", reference is conventionally made here to a line terminated by an open circuit placed in parallel with another line.

The existence of such an open stub, on the assumption that the impedance matching circuits are not used, involves a risk of occurrence of a short circuit at the level of the connection point. More particularly, this risk materializes when the length of the transmission line associated with said open stub is a rational multiple of the wavelength associated with the signals incident to the antennas, the rational multiple in question being of the form ¼+n/2 where n is a natural number (n greater than or equal to 0).

The impedance matching circuits therefore allow, when configured appropriately, avoiding the inconveniences related to an open stub. This allows optimizing the transfer of electromagnetic energy along the transmission lines, and therefore particularly between the chains of the pairs when the communication device is configured in said second operating mode.

Similarly to what was mentioned above for the first embodiment of the switching means, it should be noted that the alternation between the operating modes of the communication device implies that, in said second embodiment of the switching means, the first/second inverters respectively associated with the phase-shifters integrated into the reception chains (respectively into the reception chains) are jointly piloted so as to be all in the same configuration at the same time when the communication device is in a given operating mode. It is therefore understood that the first/second inverters respectively associated with the phase-shifters integrated into the reception chains (respectively into the reception chains) form a multipole inverter. There is therefore a first multipole inverter and a second multipole inverter for the phase-shifters integrated into the emission chains (respectively into the reception chains).

In particular embodiments, said at least one controlling module is configured to implement the alternation between said at least two distinct modes according to a determined time scheme.

In particular embodiments, said determined time scheme is compliant with a telecommunication protocol.

In particular embodiments, said at least one controlling module is configured to implement the alternation between said at least two distinct modes according to a dynamic time scheme.

In particular embodiments, the power amplifier and the low-noise amplifier belonging to each pair of chains are configured so that the product of their respective gains is less than or equal to 1 when the device is configured according to said second mode (i.e. said second operating mode).

Such dispositions advantageously allow avoiding some side effects that may be encountered during the transmission of RF (Radio Frequency) signals, such as for example typically the Larsen effect.

In particular embodiments, the analog cancellation means are activated in said second mode (i.e. said second operating mode).

In particular embodiments, said at least one controlling module is configured to control the switching means and to activate/deactivate the analog and digital interference cancellation means as well as all or part of the emission and reception chains, so that the device is able to alternate between said first mode, said second mode and at least one mode among:
- a third mode in which the emission/reception chains are activated/deactivated, the phase-shifters of the first set being connected to their respective emission chains via their second port,
- a fourth mode in which the emission/reception chains are deactivated/activated, the phase-shifters of the second set being connected to their respective reception chains via their second port.

Such dispositions allow the communication device to perform communications in a traditional manner (i.e. emission and/or reception of transmission beams within the framework of the third and/or the fourth operating mode).

According to a second aspect, the invention relates to a wireless communication system including:
- a first wireless communication device configured to emit at least one transmission beam,
- a second wireless communication device according to the invention, able to reflect at least one of said transmission beams in a determined direction when it is configured according to said second mode,
- a third wireless communication device configured to receive said at least one transmission beam reflected by said second communication device.

According to a third aspect, the invention relates to a method for controlling the operation of a wireless communication device according to the invention, said controlling method being implemented by said at least one controlling module of said wireless communication device, and in which the switching means are controlled and the analog and digital interference cancellation means of said device as well as all or part of the emission and reception chains are activated or deactivated such that said wireless communication device alternates between said at least two distinct modes.

The controlling method according to the invention therefore inherits the advantages provided by the communication device according to the invention, said at least one controlling module therefore making it possible to configure this device in the operating mode that allows it to reflect one or several transmission beams in a given direction thanks to the passive phase-shifters.

According to a fourth aspect, the invention relates to a computer program including instructions for the implementation of a controlling method according to the invention when said program is executed by a computer.

This program can use any programming language, and be in the form of source code, object code, or intermediate code between source code and object code, such as in partially compiled form, or in any other desirable form.

According to a fifth aspect, the invention relates to a computer-readable information or recording medium on which a computer program according to the invention is recorded.

The information or recording medium can be any entity or device capable of storing the program. For example, the medium can include a storage means, such as a ROM, for example a CD ROM or a microelectronic circuit ROM, or even a magnetic recording medium, for example a floppy disk or a hard disk.

On the other hand, the information or recording medium can be a transmissible medium such as an electrical or optical signal, which can be routed via an electrical or optical cable, by radio or by other means. The program according to the invention can be particularly downloaded from an Internet-type network.

Alternatively, the information or recording medium can be an integrated circuit in which the program is incorporated, the circuit being adapted to execute or to be used in the execution of the method in question.

According to a sixth aspect, the invention relates to a communication method implemented by a wireless communication system according to the invention, in which at least one transmission beam emitted by the first communication device is reflected by the second communication device when said second communication device is in said second mode (i.e. said second operating mode) and received by the third communication device.

In particular modes of implementation, the second wireless communication device includes passive phase-shifters distributed according to a first set and a second set, the phase-shifters of the first set/second set being connected to respective emission/reception chains. Furthermore, said communication method includes steps of:

estimating a first propagation channel between the first and second communication devices, determining, by the second communication device and according to the estimation of the first propagation channel, a first phase law able to configure the passive phase-shifters of said second set so as to favor the reception of said at least one transmission beam coming from the first communication device, estimating a second propagation channel between the second and third communication devices, determining, by the second communication device and according to the estimation of the second propagation channel, a second phase law able to configure the passive phase-shifters of said first set so as to favor an emission of the transmission beam in the direction of said third communication device, reflecting, by the second communication device configured in said second mode (i.e. said second operating mode), said at least one transmission beam towards the third communication device, said first and second phase laws being applied simultaneously by respectively the phase-shifters of the second set and the phase-shifters of the first set.

BRIEF DESCRIPTION OF THE DRAWINGS

Other characteristics and advantages of the present invention will become apparent from the description given below, with reference to the appended drawings which illustrate one exemplary embodiment devoid of any limiting character. On the figures.

DESCRIPTION OF THE EMBODIMENTS

Figure 1:
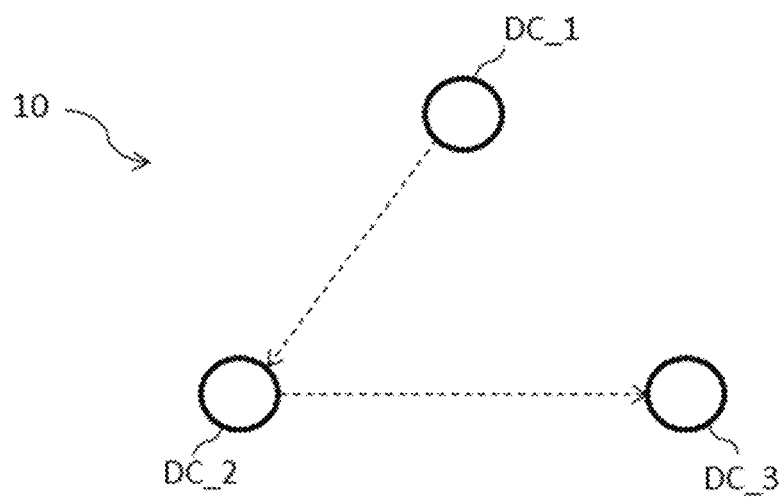
FIG. 1 schematically represents, in its environment, one particular embodiment of a communication system according to the invention.

FIG. 1 schematically represents, in its environment, one particular embodiment of a wireless communication system 10 according to the invention.

The wireless communications system 10 is a multi-antenna or MIMO system. As illustrated in FIG. 1, this system 10 includes a first wireless communication device DC_1, a second communication device DC_2 according to the invention as well as a third communication device DC_3.

In the present embodiment, and for the purpose of simplifying the description, it is considered that the communication system 10 includes only said communication devices DC_1, DC_2 and DC_3. It should however be noted that no limitation is attached to the number of communication devices (including in particular communication devices according to the invention) that can be considered within the framework of the present invention. The following developments can indeed be generalized without difficulty by those skilled in the art in the event that more than three wireless communication devices (including a plurality of communication devices according to the invention) are considered.

The second wireless communication device DC_2 includes a plurality of antenna elements $A\_1, \ldots, A\_N$, N being an integer strictly greater than 1 (not represented in FIG. 1) organized in the form of an array of antennas and configured to emit and receive beams, these latter serving as a support for the simultaneous transmission of several data streams to serve one or several determined portions of space. Such beams are called "transmission beams" in the remainder of the description. It should be noted that the number of antennas equipping the communication device DC_2 does not constitute a limiting factor of the invention, as long as this number is greater than 2.

Each communication device DC_1, DC_3 is for its part equipped with at least one antenna. No limitation is attached to the number of antennas equipping each of said communication devices DC_1, DC_3.

In this manner, the communication device DC_2 is able to communicate with the communication devices DC_1 and DC_3. Of course, nothing excludes envisaging that the communication devices DC_1 and DC_3 can communicate directly with each other.

The communication devices DC_1, DC_2 and DC_3 belong to a wireless communication network (not represented in FIG. 1) and are able to communicate with each other in a frequency band associated with this wireless communication network. For the remainder of the description, it is considered in a non-limiting manner that said telecommunication network is a mobile network of the 5G type.

It should however be specified that the invention remains applicable to other types of telecommunications network, such as a 4G, 3G, Wi-Fi, etc. mobile network. In general, no limitation is attached to the nature of the telecommunications network that can be considered within the framework of the present invention.

It should also be noted that the invention is applicable regardless of the nature of said communication devices DC_1, DC_2 and DC_3, as long as these latter are able to perform wireless communications. Thus, nothing excludes considering that at least one of the communication devices is a mobile terminal, such as a laptop computer, a personal assistant, a connected object, a mobile phone of the smartphone type, etc. and that at least one other of said communication devices is a base station. Also, nothing excludes considering that the communication devices DC_1, DC_2 and DC_3 are all three mobile terminals or all three base stations.

Figure 2:
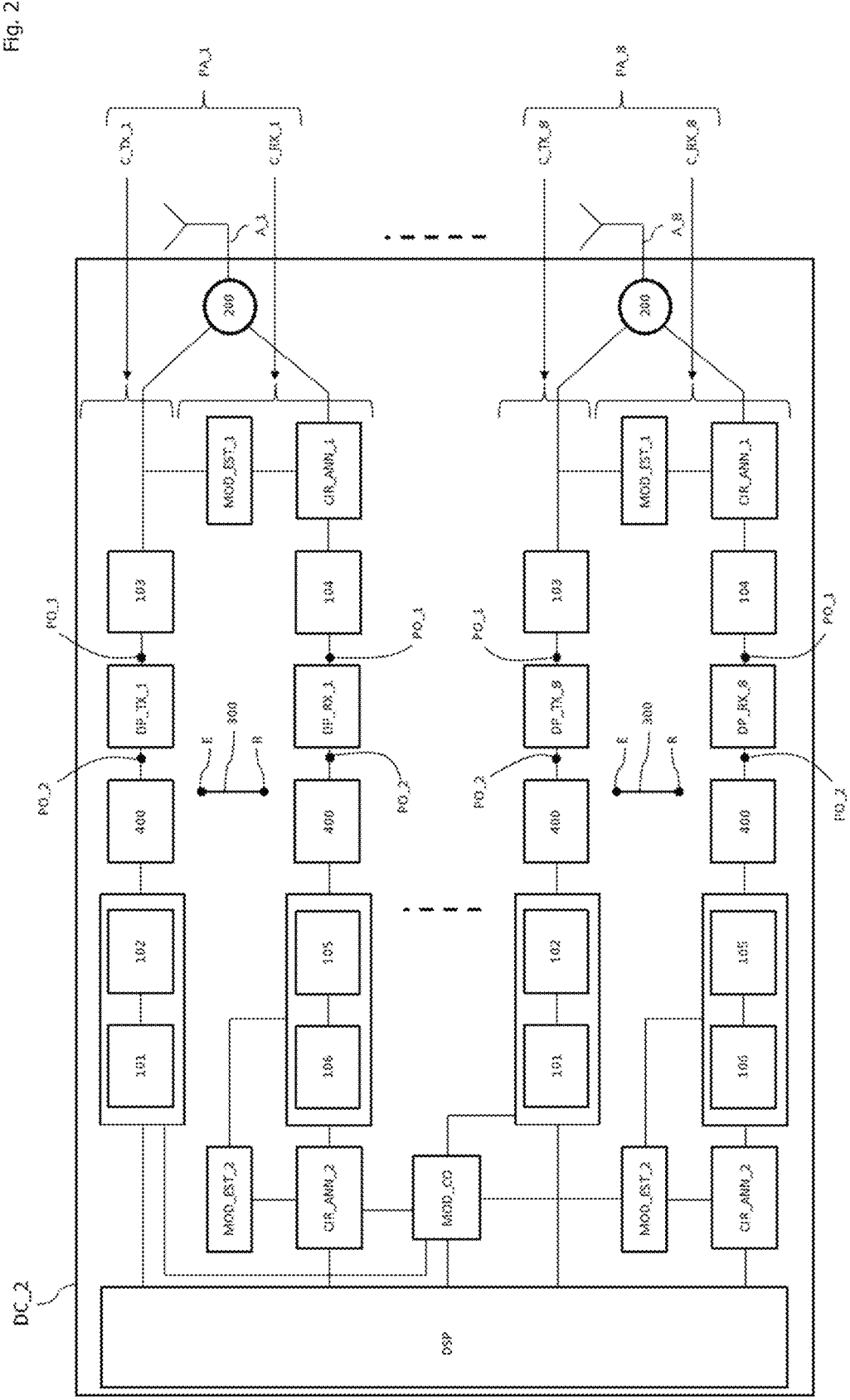
FIG. 2 schematically represents an example of hardware architecture of a wireless communication device according to the invention belonging to the communication system of FIG. 1.

FIG. 2 schematically represents an example of hardware architecture of the second wireless device DC_2 according to the invention belonging to the communication system 10 of FIG. 1.

It is important to note that FIG. 2 here schematically illustrates a general structure of the transmitting device DC_2 according to the invention. Specific embodiments of this architecture are described in more detail later.

In accordance with the invention, the communication device DC_2 has an architecture configured to emit and receive transmission beams in full-duplex mode via said antenna elements A_1, . . . , A_N.

The advantages proposed by such a full-duplex architecture lie in particular in the fact that the second device DC_2 is able to simultaneously emit and receive signals in the form of transmission beams in the frequency band associated therewith. Such dispositions advantageously allow avoiding having to load multiple frequency bands, which are rare resources, on the one hand to emit and on the other hand to receive signals, thus improving the spectral efficiency of said second device DC_2.

In the example of FIG. 2, the number N of antenna elements is considered equal to 8 (for the purposes of simplifying FIG. 2, only the antennas A_1 and A_8 are represented in detail). Furthermore, in this exemplary embodiment, each antenna A_i is configured not only to emit transmission beams but also to receive them. In other words, each antenna A_i is both emitting and receiving.

The second device DC_2 also includes, due to said full-duplex architecture, a plurality of RF (Radio Frequency) emission chains as well as a plurality of RF reception chains.

In the present exemplary embodiment, and as illustrated by FIG. 2, each antenna A_i (i is an integer index comprised between 1 and N) is connected by means of a circulator 200 to a pair PA_i of RF channels including a emission chain C_TX_i as well as a reception chain C_RX_i. In other words, each emission C_TX_i/reception C_RX_i chain is associated with a reception C_RX_i/emission C_TX_i chain so as to form a pair PA_i of chains for said antenna A_i. Thus, there are as many pairs PA_i of chains as there are antennas A_i.

In addition, each emission chain C_TX_i includes a digital-analog converter 101, a modulator 102 and a power amplifier 103 connected to the antenna element A_i with which said chain C_TX_i is associated. Each reception chain C_RX_i, for its part, includes a low-noise amplifier 104 connected to the antenna element A_i with which said chain C_RX_i is associated, as well as a demodulator 105 and an analog-digital converter 106.

Of course, an emission chain C_TX_i (respectively a reception chain C_RX_i) can also include other electronic pieces of equipment (filters, etc.), this aspect not being described further here because it is outside the framework of the invention.

The second device DC_2 also includes an electronic signal processing unit, called DSP (Digital Signal Processing) unit. Said DSP unit is configured to generate baseband signals intended to be routed towards the antennas A_i via said emission chains C_TX_i, as well as to process signals received by the antennas A_i and routed to said DSP unit via said reception chains C_RX_i.

For this purpose, the DSP unit includes for example one or several processors and storage means (magnetic hard disk, electronic memory, optical disk, etc.) in which data and a computer program are stored, in the form of a set of program code instructions to be executed in order to implement the aforementioned signal processings.

Alternatively or additionally, the DSP unit also includes one or several programmable logic circuits, of the FPGA, PLD, etc. type, and/or specific integrated circuits (ASIC), and/or a set of discrete electronic components, etc. adapted to implement said signal processings.

In other words, the DSP unit includes a set of means configured in software (specific computer program) and/or in hardware (FPGA, PLD, ASIC, etc.) to implement said signal processings.

The second device DC_2 further includes passive phase-shifters DP_TX_1, DP_TX_N as well as passive phase-shifters DP_RX_1, . . . , DP_RX_N. Said passive phase-shifters are of a design known per se and are configured to assign weights to analog signals, in an adjusted and adaptive manner with a view to the emission or reception of transmission beams by the network of the antenna elements jA_1, . . . , A_N, for example to form part of a given communication strategy. By way of illustration, such a strategy can consist in maximizing the power of the signal received at the level of one or several receiving terminals, such as for example the communication device DC_3.

Each passive phase-shifter is integrated into an emission chain or a reception chain, it being understood that a single passive phase-shifter is integrated into each chain.

More specifically, the passive phase-shifters are divided into two distinct sets, namely a first set E_1 and a second set E_2. Said first set E_1 comprises the phase-shifters DP_TX_1, . . . , DP_TX_N respectively integrated into the emission chains C_TX_1, . . . , C_TX_N. Said second set E_2 comprises, for its part, the phase-shifters DP_RX_1, . . . , DP_RX_N respectively integrated into the reception chains C_RX_1, . . . , C_RX_N. Thus, for a fixed index i, a pair PA_i of chains is associated with two phase-shifters, namely the phase-shifters DP_TX_i and DP_RX_i respectively integrated into the chains C_TX_i and C_RX_i of said pair PA_i.

Each passive phase-shifter DP_TX_i separates the emission chain C_TX_i into which it is integrated into a part called "inner" part comprising said digital-analog converter 101 and said modulator 102, as well as a part called "outer" part comprising said power amplifier 103. Similarly, each reception chain C_RX_i includes a part called "outer" part comprising said low-noise amplifier 104 as well as a part called "inner" part comprising said demodulator 105 and said analog-digital converter 106.

Conventionally, each passive phase-shifter DP_TX_i/DP_RX_i includes a first port PO_1 and a second port PO_2. Furthermore, and in accordance with the invention, each phase-shifter DP_TX_i of the first set E_1 (respectively each phase-shifter DP_RX_i of the second set E_2) is connected, via its first port PO_1, to the power amplifier 103 (respectively to the low-noise amplifier 104) of the emission chain C_TX_i (respectively of the reception chain C_RX_i) into which it is integrated. The second port PO_2 of each phase-shifter DP_TX_i of the first set E_1 (respectively of each phase-shifter DP_RX_i of the second set E_2), for its part, is intended to be connected, via switching means in accordance with the invention and described later, to the inner part of the chain into which said phase-shifter DP_TX_i (respectively said phase-shifter DP_RX_i) is integrated or to a junction circuit in accordance with the invention and equipping the second device DC_2, this junction circuit also being described in more detail later.

The second device DC_2 also includes, in a conventional manner due to its full-duplex architecture, analog and digital interference cancellation means. Said analog and digital means include, for each pair PA_i of chains, a first estimation module MOD_EST_1 and a second estimation module MOD_EST_2.

Said first estimation module MOD_EST_1 is an analog module configured to determine, in particular during a time frame during which the second device DC_2 communicates in full-duplex mode (simultaneous emission and reception), an estimation of a contribution C_1 to a signal S_RX received (in the form of a transmission beam) by said second device DC_2. Said contribution C_1 results from a direct propagation towards the second device DC_2 of a signal S_TX emitted (in the form of a transmission beam and simultaneously with the reception of said signal S_RX) by the latter.

By "direct propagation of the signal S_TX", reference is here made to a propagation during which no obstacle likely to modify the path of the signal S_TX is encountered. In other words, the signal S_TX emitted by the second device DC_2 contributes to the overall signal S_RX received by the latter without having been reflected beforehand. Consequently, at the level of the antenna A_i associated with the pair PA_i, the signal S_TX can interfere in particular with one or several signals emitted by other devices, such as for example the device DC_3, with a view to communicating with the device DC_2. Also, the contribution C_1 associated with this direct propagation of the signal S_TX is still called "direct self-interference" in the state of the art.

Said second estimation module MOD_EST_2 is for its part a digital (i.e. software) module configured to determine, in particular during said time frame during which the second device DC_2 communicates in full-duplex mode, an estimation of a sum comprising:
- a first term corresponding to a difference between C_1 and the estimation of C_1,
- a second term corresponding to an estimation of a contribution C_2 resulting from an indirect propagation, following one or several reflections, of the signal S_TX towards the second device DC_2, said reflection(s) being implemented by one or several elements.

By "indirect propagation of the signal S_TX", reference is made here to a propagation during which said elements form obstacles likely to modify the path of the signal S_TX so that the latter is reflected towards the reception antenna A_i associated with said pair PA_i. Such elements are conventionally positioned in the environment of the communication system 10. For example, it can be a glass surface, a wall, etc. Consequently, at the level of the antenna A_i associated with the pair PA_i, the reflection(s) of the signal S_TX can interfere in particular with one or several signals emitted by other devices, such as for example the device DC_3, with a view to communicating with the device DC_2. Also, the contribution C_2 associated with this indirect propagation of the signal S_TX is still called "reflected self-interference" in the state of the art.

Said analog and digital means also include, for each pair PA_i of chains, an analog circuit CIR_ANN_1, of design known per se, arranged between the antenna A_i and the low-noise amplifier 104 of the reception chain C_RX_i belonging to said pair PA_i. Said analog circuit CIR_ANN_1 is configured to subtract from a signal received by the second device DC_2 said estimation provided by the first estimation module MOD_EST_1. In addition, said analog and digital means also include a digital circuit CIR_ANN_2, of design known per se, arranged between the analog-digital converter 106 of said reception chain C_RX_i and the DSP unit. Said digital circuit CIR_ANN_2 is configured to subtract from the signal routed from the low-noise amplifier 104 said estimation provided by the second estimation module MOD_EST_2.

As regards the way in which said estimations of the contributions C_1 and C_2 can be determined by respectively the first estimation module MOD_EST_1 and the second estimation module MOD_EST_2, those skilled in the art can view the document by A. Sabharwal et al already mentioned before which addresses these aspects in detail. At the very least, and in a general way, it is noted here that the first estimation module MOD_EST_1 (respectively the second estimation module MOD_EST_2) performs its estimation according to a signal emitted (respectively according to sequences of complex numbers representative of a signal intended to be emitted) by the second device DC_2 and of which it acquires the knowledge via a sampling between the power amplifier 103 and the antenna A_i (respectively via a sampling between the DSP unit and the digital-analog converter 101).

The second device DC_2 also includes, for each pair PA_i of chains, a junction circuit 300 arranged between the chains of said pair PA_i. Said junction circuit 300 is configured to make, in combination with the switching means already mentioned above and according to a particular configuration of these latter, a junction between the emission chain C_TX_i and the reception chain C_RX_i forming said pair PA_i. More particularly, said junction is intended to be made, for each chain C_TX_i/C_RX_i, at the level of the inner part of said chain C_TX_i/C_RX_i, between the second port PO_2 of the passive phase-shifter DP_TX_i/DP_RX_i integrated into said chain C_TX_i/C_RX_i and the component of said inner part arranged as close as possible to said passive phase-shifter DP_TX_i/DP_RX_i (i.e. the modulator 102/the demodulator 105 in the present exemplary embodiment).

Furthermore, said junction circuit 300 is configured so that an electromagnetic energy (for example the electromagnetic energy associated with a transmission beam) routed at the inlet of said junction circuit 300 is transmitted at the outlet of the latter.

For example, and as illustrated in FIG. 2, said junction circuit 300 is an electrical wire including two ends each forming a connection point. A first end, called "end E", forms an inlet/outlet of said junction circuit 300 and is intended to be connected, via said switching means, to the emission chain C_TX_i. A second end, called "end R", also forms an inlet/outlet of said junction circuit 300 and is for its part intended to be connected, via said switching means, to the reception chain C_RX_i.

Of course, nothing excludes considering a junction circuit other than a single electric wire as long as the latter is able to perform, in combination with the switching means and according to one particular configuration of these latter, a junction between the emission chain C_TX_i and the reception chain C_RX_i, and to allow the transmission of electromagnetic energy between said chains C_TX_i, C_RX_i.

The second device DC_2 also includes, as already mentioned above, switching means 400. Said switching means 400 are represented schematically in FIG. 2. More specific embodiments of said switching means are described in detail below by considering a first embodiment in which the switching means include, for each passive phase-shifter, an inverter (FIG. 4) or two inverters (FIG. 5).

In the present exemplary embodiment, and as illustrated by FIG. 2, the second communication device DC_2 includes a controlling module MOD_CO configured to implement processings aimed at allowing the second communication device DC_2 to emit one or several transmission beams, receive one or several transmission beams (possibly simultaneously with the emission of one or several transmission beams) or reflect one or several transmission beams received at the level of the antenna elements A_1, ..., A_N, by implementing a method for controlling the operation of said device DC_2.

Figure 3:
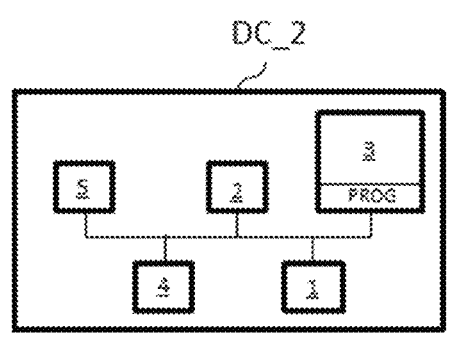
FIG. 3 is an alternative schematic representation of the hardware architecture of the communication device of FIG. 2.

FIG. 3 is an alternative schematic representation of the hardware architecture of the second controlling device DC_2 according to the invention for implementing said controlling method.

As illustrated in FIG. 3, the second device DC_2 has the hardware architecture of a computer. Thus, said second device DC_2 includes, in particular, a processor 1, a random access memory 2, a read only memory 3 and a non-volatile memory 4. It further has a communication module 5.

The read only memory 3 of the second device DC_2 constitutes a recording medium in accordance with the invention, readable by the processor 1 and on which a computer program PROG in accordance with the invention is recorded, including instructions for the execution of steps of the controlling method according to the invention. The program PROG allows defining the controlling module MOD_CO as a functional module of said second device DC_2. Said controlling module MOD_CO is configured to control, based on the hardware elements 1 to 5 of the second device DC_2 mentioned above, said switching means 400 and to activate/deactivate said analog and digital interference cancellation means as well as all or part of the emission C_TX_i and reception C_RX_i chains, so that the second device DC_2 is able to alternate between four distinct modes.

By "activation/deactivation" of a chain or part of a chain, reference is made here to the activation/deactivation of all the components or of only part of the components forming said chain.

In this exemplary embodiment, it is considered that the controlling module MOD_CO is also configured to determine the weights that should be assigned to the different passive phase-shifters DP_TX_i, DP_RX_i, but also to control them according to the weights that have been determined.

However, nothing excludes envisaging, according to other examples not detailed here, using a controlling module other than the module M_CO and configured to determine the weights to be assigned to the passive phase-shifters DP_TX_i, DP_RX_i, as well as to control them according to the weights that have been determined.

The communication module 5 in particular allows the controlling module MOD_CO to transmit control signals to the switching means 400, to the analog and digital interference cancellation means as well as to the emission C_TX_i and reception C_RX_i chains. This communication module 5 includes for example a computer data bus able to transmit said control signals. According to another example, the communication module 5 includes a wired or wireless communication interface able to implement any suitable protocol known to those skilled in the art (Ethernet, Wi-fi, Bluetooth, 3G, 4G, 5G, etc.).

Said four modes are respectively denoted M1 (first mode), M2 (second mode), M3 (third mode) and M4 (fourth mode) for the remainder of the description.

The first mode M1 is a mode in which the analog and digital interference cancellation means as well as the emission C_TX_i and reception C_RX_i chains are activated, the phase-shifters DP_TX_i, DP_RX_i being connected to their respective chains C_TX_i, C_RX_i via their second port PO_2. In other words, said mode M1 corresponds to a mode in which the second device DC_2 is able to simultaneously emit and receive one or several transmission beams. The mode M1 therefore corresponds to a full-duplex mode.

The second mode M2 is a mode in which the chains C_TX_i, C_RX_i, apart from their respective amplifiers 103, 104, are deactivated. Furthermore, in said second mode M2, the second port PO_2 of a phase-shifter DP_TX_i/DP_RX_i integrated into a chain C_TX_i/C_RX_i of a pair PA_i of chains is connected, via the junction circuit 300 associated with said pair PA_i, to the second port PO_2 of the phase-shifter DP_RX_i/DP_TX_i integrated into the other chain C_RX_i/C_TX_i of said pair PA_i.

Said mode M2 corresponds to a mode in which the second device DC_2 is configured to reflect one or several transmission beams in a direction determined by the configuration of the passive phase-shifters (i.e. in a direction determined according to the weights associated with the passive phase-shifters). Such a reflection is permitted due to the junction made between the chains C_TX_i, C_RX_i of each of the pairs PA_i due to a suitable configuration, and controlled by the controlling module MOD_CO, of the switching means 400 in combination with the junction circuit 300.

Indeed, the electromagnetic energy associated with a beam incident to an antenna A_i is redirected in a determined direction in space due to said configuration of the phase-shifters DP_TX_i, DP_RX_i, and after having passed through part of the chains by means of the junction thus established by combination of the switching means 400 and the junction circuit 300.

It should be noted that in this second mode M2, said analog interference cancellation means can be either activated or deactivated. Preferably, said analog interference cancellation means are activated, thus making it possible to avoid some side effects which may be encountered during the transmission of RF signals, such as for example typically the Larsen effect.

The third mode M3 is a mode in which the emission C_TX_i/reception C_RX_i chains are activated/deactivated, the phase-shifters DP_TX_i of the first set E_1 being connected to their respective emission chains C_TX_i via their second port PO_2. In other words, said mode M3 corresponds to a mode in which the second device DC_2 is able to emit one or several transmission beams, but is however not able to receive one or several transmission beams.

It should be noted that in this third mode M3, said analog and digital interference cancellation means can be either activated or deactivated. Indeed, insofar as the second device DC_2 is unable to receive transmission beams, said analog and digital interference cancellation means play no role. That being so, and for reasons of reducing the energy consumption of the second device DC_2, said cancellation means are preferentially deactivated in said third mode M3.

The fourth mode M4 is a mode in which the emission C_TX_i/reception C_RX_i chains are deactivated/activated, the phase-shifters DP_RX_i of the second set E_2 being connected to their respective reception chains C_RX_i via their second port PO_2. In other words, said fourth mode M4 corresponds to a mode in which the second device DC_2 is able to receive one or several transmission beams, but is on the other hand not able to emit one or several transmission beams.

It should be noted that, similarly to what has been described above in the case of the third mode M3, said analog and digital interference cancellation means can be either activated or deactivated in the fourth mode M4.

Again, for reasons of reducing the energy consumption of the second device DC_2, said cancellation means are preferably deactivated in said fourth mode M4.

In a more particular embodiment, the power amplifier 103 and the low-noise amplifier 104 belonging to each pair PA_i of chains are configured so that the product of their respective gains is less than or equal to 1 when the second device DC_2 is configured according to the second mode M2. Such dispositions advantageously allow avoiding some side effects which may be encountered during the transmission of RF signals, such as for example typically the Larsen effect.

The controlling of the operation of the second device DC_2, implemented by the controlling module MOD_CO, therefore allows alternating between the four modes M1, M2, M3 et M4. The fact of allowing the device DC_2 to operate according to said second mode M2 is particularly advantageous. Indeed, when the passive phase-shifters DP_TX_i, DP_RX_i are configured in an appropriate manner, this gives the possibility of improving any communications between the first communication device DC_1 and the third communication device DC_3 of the system 10, the second communication device DC_2 thus playing the role of an intelligent surface.

This is advantageous insofar as the second communication device DC_2 can correspond to a piece of equipment already present in the environment of said first and third communication devices. In other words, by configuring according to the invention a traditional communication device (mobile terminal, base station, etc.) having a full-duplex architecture, it is not necessary to use, as done in the state of the art, intelligent surfaces that are expensive and complex to implement.

In a more particular embodiment, the controlling module MOD_CO is configured to implement the alternation between said four modes M1, M2, M3 and M4 according to a predetermined time scheme.

By "predetermined time scheme", reference is made here to the fact that determined time periods are allocated to each of said four modes, the controlling of the operation of the second device DC_2 being carried out so that these time periods are met.

By way of non-limiting example, said determined time scheme is compliant with a telecommunications protocol. Such a protocol can be specified in a telecommunication standard, for example a 3GPP (3rd Generation Partnership Project) standard.

According to another example, or possibly according to one particular implementation of a telecommunication protocol, the determined time scheme includes:
a first time period during the day during which the second device DC_2 only alternates between the first M1, third M3 and fourth M4 modes,
a second time period during the night during which the second communication device DC_2 operates only according to said second mode M2, the respective durations of said first and second time periods being able for example to be fixed by an operator in charge of operating the telecommunication network.

In general, no limitation is attached to the duration and to the number of said time periods, and therefore ultimately to the structure of said determined time scheme. Furthermore, such a determined time scheme is not only known to the second communication device DC_2, but can also possibly be the first and third communication devices DC_1, DC_3.

Alternatively, the controlling module MOD_CO is configured to implement the alternation between said four distinct modes M1, M2, M3 et M4 according to a dynamic time scheme.

By "dynamic time scheme", reference is made here to a time scheme according to which the alternation between the four operating modes of the second device DC_2 takes place according to time periods that are not predetermined. In other words, the alternation between the four modes can be done freely, on the fly.

For example, signaling messages can be exchanged dynamically between the devices DC_1, DC_2 and DC_3. These messages are configured so that once received by the second device DC_2 (respectively by the first and third devices DC_1, DC_3), the latter knows in which mode it must operate (respectively these latter know in which mode the second device DC_2 is configured).

It emerges from the description of said four operating modes M1, M2, M3 and M4 of the second device DC_2 that the switching means 400 have the function, and this regardless of the embodiment envisaged for these latter, of:
connecting the phase-shifters DP_TX_i and DP_RX_i respectively integrated into the chains C_TX_i and C_RX_i to the inner parts of said chains when they are configured according to a first configuration. Said link takes place here more particularly at the level of the second ports PO_2 of said phase-shifters;
connecting the junction circuit 300 to the emission C_TX_i and reception C_RX_i chains when they are configured according to a second configuration. Ultimately, in this second configuration, said switching means 400 also allow isolating the phase-shifters DP_TX_i and DP_RX_i respectively integrated into the chains C_TX_i and C_RX_i from the inner parts of these chains. By "isolating", there is reference to the fact that no energy can be transmitted between the phase-shifters and the inner parts of the chains.

The remainder of the description aims at describing in more detail more particular embodiments of the switching means 400 of FIG. 2.

Figure 4:
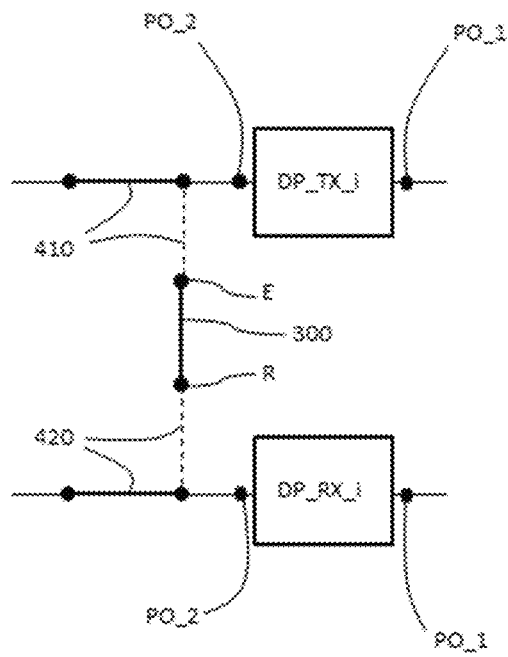
FIG. 4 schematically represents a first particular embodiment of switching means equipping the communication device of FIG. 2, according to an enlarged partial view of said device.
Figure 5:
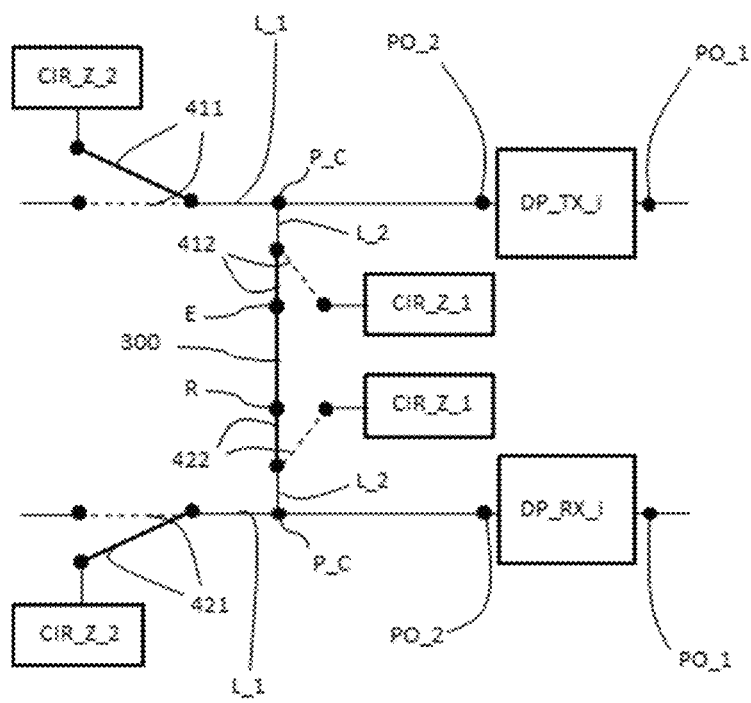
FIG. 5 schematically represents a second particular embodiment of switching means equipping the communication device of FIG. 2, according to an enlarged partial view of said device.

FIG. 4 schematically represents a first particular embodiment of the switching means according to an enlarged partial view of the second device DC_2 at the level of a pair PA_i of chains C_TX_i, C_RX_i.

As illustrated in FIG. 4, the switching means include in said first embodiment, and for each passive phase-shifter DP_TX_i, DP_RX_i, an inverter 410, 420 (the reference "410" being associated with a phase-shifter DP_TX_i, and the reference "420" with a phase-shifter DP_RX_i). In a manner known per se, said inverter includes at least two ways that can be activated to make connections following said at least two ways. In said first embodiment, the inverter 410, 420 associated with a phase-shifter DP_TX_i, DP_RX_i is configurable according to two configurations:
a first configuration in which said inverter 410, 420 connects the second port PO_2 of said phase-shifter DP_TX_i, DP_RX_i to the chain C_TX_i, C_RX_i (more particularly to the inner part of said chain C_TX_i, C_RX_i) into which said phase-shifter DP_TX_i, DP_RX_i is integrated. Thus, in this first configuration, said connection is made by activation of a first way of the inverter 410, 420,
a second configuration in which said inverter 410, 420 connects the second port PO_2 of said phase-shifter DP_TX_i, DP_RX_i to the junction circuit 300 associated with the pair PA_i of chains comprising the chain C_TX_i, C_RX_i into which said phase-shifter DP_TX_i, DP_RX_i is integrated. More particularly, in this exemplary embodiment, the second port PO_2 of the phase-shifter DP_TX_i (respectively of the phase-shifter DP_RX_i) is connected to the end E (respectively to the end R) of the junction circuit 300. Thus, in this second configuration, said connection is made by activation of a second way of the inverter 410, 420.

It should be noted that in FIG. 4, said inverters are all configured, by way of illustration, according to their first configuration (the first way of each inverter 410, 420 being represented in solid lines, the second way being represented in dotted lines).

It emerges from the description of the different configurations of the inverters 410, 420 that, in the first mode M1 of the second device DC_2, the inverter 410, 420 of each phase-shifter DP_TX_i, DP_RX_i of said first and second sets E_1, E_2 is configured in its first configuration.

In the second mode M2 of the second device DC_2, the inverter 410, 420 of each phase-shifter DP_TX_i, DP_RX_i of said first and second sets E_1, E_2 is configured in its second configuration.

In the third mode M3 of the second device DC_2, the inverter 410 of each phase-shifter DP_TX_i of the first set E_1 is configured in its first configuration. Furthermore, in this third mode M3, the configuration of the inverter 420 of each phase-shifter DP_RX_i of the second set E_2 is for its part arbitrary given that the reception chain C_RX_i into which said phase-shifter DP_RX_i is integrated is deactivated.

In the fourth mode M4 of the second device DC_2, the inverter 420 of each phase-shifter DP_RX_i of the second set E_2 is configured in its first configuration. Furthermore, in this fourth mode M4, the configuration of the inverter 410 of each phase-shifter DP_TX_i of the first set E_1 is for its part arbitrary given that the emission chain C_TX_i into which said phase-shifter DP_TX_i is integrated is deactivated.

FIG. 5 schematically represents a second particular embodiment of the switching means according to an enlarged partial view of the second device DC_2 at the level of a pair PA_i of chains C_TX_i, C_RX_i.

As illustrated in FIG. 5, the switching means include in said second embodiment, and for each passive phase-shifter DP_TX_i, DP_RX_i, a first inverter 411, 412 and a second inverter 421, 422 connected to respective transmission lines L_1, L_2 mounted in parallel and joining at the level of a connection point P_C to which the second port PO_2 of said phase-shifter DP_TX_i, DP_RX_i is connected (the references "411" and "412" are associated with a phase-shifter DP_TX_i, and the references "421" and "422" are associated with a phase-shifter DP_RX_i).

Furthermore, each inverter 411, 412, 421, 422 is configurable according to two configurations, a first configuration in which:
the first inverter 411, 421 connects said connection point P_C to the chain C_TX_i, C_RX_i into which said phase-shifter DP_TX_i, DP_RX_i is integrated,
the second inverter 412, 422 connects said connection point P_C to a first impedance matching circuit CIR_Z_1, as well as a second configuration in which:
the first inverter 411, 421 connects said connection point P_C to a second impedance matching circuit CIR_Z_2 distinct from said first impedance matching circuit CIR_Z_1,
the second inverter 412, 422 connects said connection point P_C to the junction circuit 300 associated with the pair PA_i of chains comprising the chain C_TX_i, C_RX_i into which said phase-shifter DP_TX_i, DP_RX_i is integrated. More particularly, in this exemplary embodiment, the connection point P_C associated with the phase-shifter DP_TX_i (respectively with the phase-shifter DP_RX_i) is connected to the end E (respectively to the end R) of the junction circuit 300.

Moreover, said first impedance circuit CIR_Z_1 (respectively the second impedance circuit CIR_Z_2) is configured to create an open circuit at the level of the connection point P_C when the second inverter 412, 422 (respectively the first inverter 411, 421) is configured in its first configuration (respectively in its second configuration).

By thus creating a "real" open circuit at the level of the connection point P_C according to the configurations of the inverters 411, 412, 421, 422, said impedance circuits CIR_Z_1, CIR_Z_2 allow compensating for the effects of an open stub.

By "open stub", reference is traditionally made here to a line terminated by an open circuit placed in parallel with another line. In the present case, if for example each inverter 411, 412, 421, 422 is configured according to its first configuration, the transmission line L_2 would form an open stub arranged in parallel with the transmission line L_1 if the impedance matching circuit CIR_Z_1 was not used. Conversely, if each inverter 411, 412, 421, 422 is configured according to its second configuration, the transmission line L_1 would form an open stub arranged in parallel with the transmission line L_2 if the impedance matching circuit CIR_Z_2 were not used.

The existence of such an open stub, on the assumption that the impedance matching circuits CIR_Z_1, CIR_Z_2 are not used, implies a risk of occurrence of a short circuit at the level of the connection point P_C. More particularly, this risk materializes when the length of the transmission line L_1, L_2 associated with said open stub is a rational multiple of the wavelength associated with the signals incident to the antennas A_i, the rational multiple in question being of the form $1/4+n/2$ where n is a natural number (n greater than or equal to 0).

The impedance matching circuits CIR_Z_1, CIR_Z_2 therefore allow, when configured appropriately, avoiding the inconveniences related to an open stub. This allows optimizing the transfer of electromagnetic energy along the transmission lines L_1, L_2, and therefore particularly between the chains of the pairs PA_i when the second device DC_2 is configured in the second mode M2.

Each impedance matching circuit CIR_Z_1, CIR_Z_2 can include different electronic components such as capacitors, inductors, resistors, etc., and more broadly any electronic component having an impedance of its own. In general, the design and the implementation of an impedance matching circuit are known to those skilled in the art, so that this aspect is not described further here. Those skilled in the art also know how to configure an impedance matching circuit according to the length of a transmission line to avoid the risks of short circuit mentioned above. It is of course understood that the respective configurations of the impedance matching circuits CIR_Z_1, CIR_Z_2 depend on the respective lengths of the transmission lines L_1, L_2 (the transmission lines L_1, L_2 associated with the same chain can be of different respective lengths; this length difference can also occur between transmission lines of an emission chain and a reception chain).

It should be noted that in FIG. 5, said inverters 411, 412, 421, 422 are all configured, by way of illustration, according to their second configuration.

It emerges from the description of the different configurations of the inverters 411, 412, 421, 422 that, in the first mode M1 of the second device DC_2, the inverter 411, 412, 421, 422 of each phase-shifter DP_TX_i, DP_RX_i of said first and second sets E_1, E_2 is configured in its first configuration.

In the second mode M2 of the second device DC_2, the inverter 411, 412, 421, 422 of each phase-shifter DP_TX_i, DP_RX_i of said first and second sets E_1, E_2 is configured in its second configuration.

In the third mode M3 of the second device DC_2, the first inverter 411 of each phase-shifter DP_TX_i of the first set E_1 is configured in its first configuration. Furthermore, in this third mode M3, the configuration of the second inverter 422 of each phase-shifter DP_RX_i of the second set E_2 is for its part arbitrary given that the reception chain C_RX_i into which said phase-shifter DP_RX_i is integrated is deactivated.

In the fourth mode M4 of the second device DC_2, the second inverter 422 of each phase-shifter DP_RX_i of the second set E_2 is configured in its first configuration. Furthermore, in this fourth mode M4, the configuration of the first inverter 411 of each phase-shifter DP_TX_i of the first set E_1 is for its part arbitrary given that the emission chain C_TX_i into which said phase-shifter DP_TX_i is integrated is deactivated.

Figure 6:
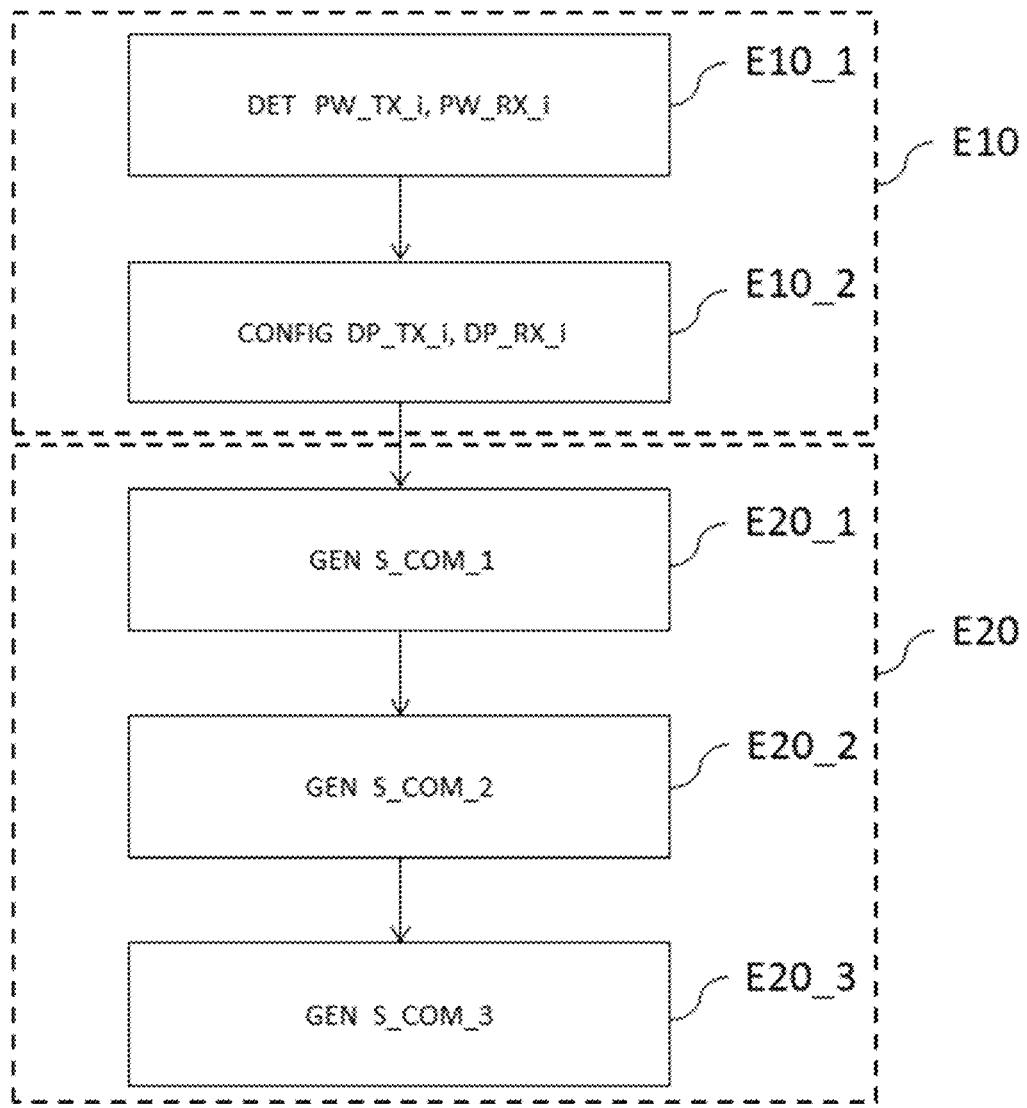
FIG. 6 represents, in the form of a flowchart, one particular exemplary implementation of a controlling method according to the invention.

FIG. 6 represents, in the form of a flowchart, a particular exemplary implementation of the controlling method according to the invention.

In this particular exemplary implementation, it is considered that the alternation between the four distinct modes associated with the second device DC_2 takes place according to a determined time scheme, and that furthermore a time period during which said device DC_2 is intended to reflect one or several transmission beams (second mode M2) in a given direction begins.

It is also considered that before the beginning of this time period, said second device DC_2 is configured in the first mode M1.

Therefore, when said time period begins, the controlling method includes a step E10 of configuring the passive phase-shifters DP_TX_i, DP_RX_i.

To this end, step E10 firstly comprises, for each passive phase-shifter DP_TX_i, DP_RX_i, a determination (sub-step E10_1) of a weight PW_TX_i, PW_RX_i according to said direction in which the beam(s) are intended to be reflected.

Then, step E10 secondly comprises a configuration (sub-step E10_2) of the passive phase-shifter s DP_TX_i, DP_RX_i according to the weights PW_TX_i, PW_RX_i which are respectively assigned to them. For this purpose, the controlling module MOD_CO generates appropriate control signals, these control signals being transmitted to the passive phase-shifters DP_TX_i, DP_RX_i.

Subsequently, the controlling method includes a step E20 of controlling the switching means 400 and of activating the analog interference cancellation means and deactivating the chains C_TX_i, C_RX_i, apart from their respective amplifiers 103, 104 so that the second communication device DC_2 moves from the first mode M1 to the second mode M2.

For this purpose, the controlling module MOD_CO generates appropriate control signals. More particularly, and with reference to FIG. 6:

a first control signal S_COM_1 is generated (sub-step E20_1) to move the switching means 400 into their second configuration;

a second control signal S_COM_2 is generated (sub-step E20_2) to activate the first estimation modules MOD_EST_1;

a third control signal S_COM_3 is generated (sub-step E20_3) to deactivate the chains C_TX_i, C_RX_i, apart from their respective amplifiers 103, 104.

Of course, the exemplary implementation of FIG. 6 is given here for purely illustrative purposes, the controlling method according to the invention not being limited in any way to a passage from the first mode to the second mode. Thus, any sequence formed by passages from a given mode to another given mode of the second device DC_2 can be envisaged. The controlling method according to the invention can therefore include other control steps and/or configuration steps so as to allow the passages between these different modes.

Moreover, it is important to note that the invention has been described so far by considering that the second communication device was able to alternate between the four distinct modes M1, M2, M3 and M4. This being the case, the invention remains applicable as long as said second communication device DC_2 is able to alternate between at least said first and second modes M1, M2. In other words, the ability of said second communication device to operate, in addition to said first and second modes M1, M2, according to at least one of said third and fourth modes M3, M4 is optional. Thus, nothing excludes that the configuration of the second communication device is limited to the modes M1, M2, or to the modes M1, M2 and M3, or to the modes M1, M2 and M4.

The controlling method has been described above without explicitly referring to a communication between the communication devices DC_1, DC_2 and DC_3 forming the system 10. It is however important to note that the invention also relates to a communication method implemented by the wireless communication system 10 of FIG. 1, in which at least one transmission beam emitted by the first communication device DC_1 is reflected by the second communication device DC_2 when said second communication device DC_2 is in said second mode M2 and received by the third communication device DC_3 (such a reflection is represented by way of illustration by means of dotted arrows in FIG. 1).

It is of course understood that the second communication device DC_2 alternates between different modes during the communication method. In other words, the controlling method described above is itself implemented implicitly during the execution of the communication method.

Figure 7:
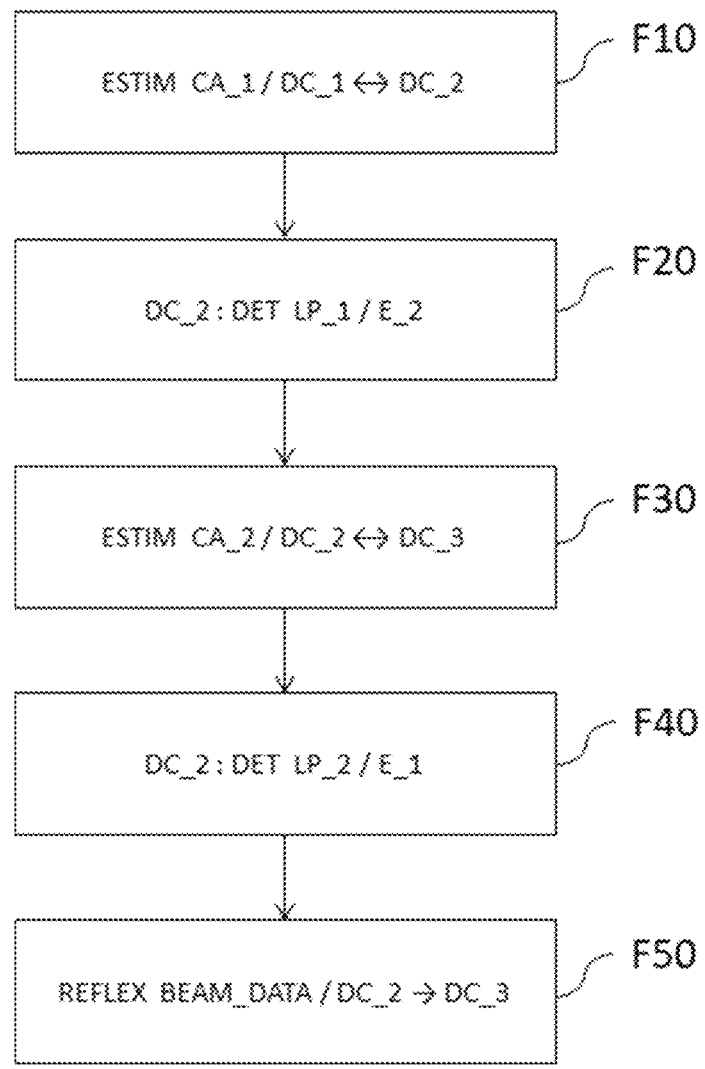
FIG. 7 represents, in the form of a flowchart, one particular exemplary implementation of a communication method according to the invention.

FIG. 7 represents, in the form of a flowchart, a particular exemplary implementation of the communication method according to the invention.

In the example of FIG. 7, the communication method including a step F10 of estimating a first propagation channel CA_1 between the first and second communication devices DC_1, DC_2.

Said step F10 is implemented in a manner known per se by said first and second communication devices DC_1, DC_2. For example, the first communication device DC_1 transmits to said second communication device DC_2 messages containing pilot symbols that allow making the estimation of said first channel. Also, in this example, the second communication device DC_2 is in the first mode M1 or the fourth mode M4.

The communication method also includes a step F20 of determining, by the second communication device DC_2 and based on the estimation of the first propagation channel CA_1, a first phase law LP_1 able to configure the passive phase-shifters DP_RX_i of the second set E_2 so as to favor the reception of at least one transmission beam coming from the first communication device DC_1.

Such a phase law LP_1 corresponding to a set of weights (a matrix of weights) intended to be assigned to the passive phase-shifters DP_RX_i in order to configure these latter so as to favor said reception coming from the first communication device DC_1.

The communication method also including a step F30 of estimating a second propagation channel CA_2 between the second and third communication devices DC_2, DC_3.

The communication method also includes a step F40 of determining, by the second communication device DC_2 and based on the estimation of the second propagation channel CA_2, a second phase law LP_2 able to configure the passive phase-shifters D_TX_i of said first set E_1 so as to favor an emission of the transmission beam in the direction of said third communication device DC_3.

Said steps F30 and F40 are implemented similarly to steps F10 and F20 respectively.

Finally, in this exemplary implementation, the communication method includes a step F50 of reflecting, by the second communication device DC_2, configured in said second mode M2, at least one transmission beam BEAM to the third device DC_3, said first LP_1 and second LP_2 phase laws being applied simultaneously by respectively the phase-shifters DP_RX_i of the second set E_2 and the phase-shifters DP_TX_i of the first set E_1.

The exemplary implementation of the communication method of FIG. 7 has been described by considering that the steps of estimating the first and second propagation channels CA_1, CA_2 (steps F10 and F30), as well as the steps of determining the first, second and third phase laws LP_1, LP_2 and LP_3 (steps F20, F40 and F50) were implemented by the second communication device DC_2. However, the invention also covers the case where at least one of these steps is implemented by processing means distinct from the communication devices and configured to carry out digital simulations based on which the estimation and/or the determination concerned is obtained.

Moreover, and similarly to what was mentioned previously within the framework of the controlling method, the communication method according to the invention not only covers the case where the communication devices DC_1, DC_2 and DC_3 communicate with each other by reflection of at least one data beam, but also the cases where these latter exchange data with each other in a conventional manner (i.e. by means of their respective emission/reception chains).

The invention has been described so far by considering that only the second communication device DC_2 was in accordance with the invention. It goes without saying that the invention remains applicable if the first communication device DC_1 and/or the third communication device DC_3 is/are also in accordance with the invention.

The invention has also been described by considering that each pair PA_i of chains was associated with a single antenna A_i. However, the invention is not limited to such an implementation. Indeed, nothing excludes envisaging one embodiment in which the communication device according to the invention includes a plurality of emission antennas as well as a plurality of reception antennas, each emission chain being connected to a single emission antenna and each reception chain being connected to a single reception antenna. In other words, in this case, each pair of chains is associated with a pair of antennas (an emission antenna and a receiving antenna).

Finally, the invention has also been described so far by considering that a single controlling module MOD_CO was implemented to perform three functions: controlling the switching means (function 1) and activating/deactivating the analog and digital interference cancellation means (function 2) as well as all or part of the emission and reception chains (function 3). However, nothing excludes envisaging having a plurality of controlling modules, each able to perform one or two of said functions 1 to 3.

The invention claimed is:

1. A wireless communication device having an architecture configured to emit and receive transmission beams in full-duplex mode via an array of antenna elements and including:
   a plurality of passive phase-shifters distributed according to a first set of passive phase-shifters and a second set of passive phase-shifters, each of said plurality of passive phase-shifters including a first port and a second port, the phase shifters of the first set of passive shape shifters and the second set of passive phase-shifters being respectively connected, via their first ports, to power low-noise amplifiers of emission reception chains connected to said antenna elements, each emission/reception chain being associated with a reception/emission chain so as to form a pair of chains,
   a junction circuit being arranged between the chains of each pair of chains, and
   at least one controlling module configured to control switching means (400) of said device and to activate/deactivate analog and digital interference cancellation means of said device as well as all or part of the emission and reception chains, so that the device is able to alternate between at least two distinct modes:
      a first mode in which the cancellation means as well as the emission and reception chains are activated, the passive phase-shifters being connected to their respective chains via their second port, and
      a second mode in which the chains, apart from their respective amplifiers, are deactivated, the second port of a passive phase-shifter integrated into a chain of a pair of chains being connected, via the junction circuit associated with said pair, to the second port of the passive phase-shifter integrated into the other chain of said pair.

2. The device of claim 1, wherein the switching means include, for each passive phase-shifter, an inverter configurable according to two configurations:
   a first configuration in which said inverter connects the second port of said passive phase-shifter to the chain into which said passive phase-shifter is integrated, and
   a second configuration in which said inverter connects the second port of said passive phase-shifter to the junction circuit associated with the pair of chains comprising the chain into which said passive phase-shifter is integrated.

3. The device of claim 1, wherein the switching means include, for each passive phase-shifter, a first inverter and a second inverter connected to respective transmission lines mounted in parallel and joining at the level of a connection point to which the second port of said passive phase-shifter is connected, each inverter being configurable according to two configurations:
   a first configuration in which:
      the first inverter connects said connection point to the chain into which said passive phase-shifter is integrated, the second inverter connects said connection point to a first impedance matching circuit, and a second configuration in which:
the first inverter connects said connection point to a second impedance matching circuit separate from said first impedance matching circuit,
the second inverter connects said connection point to the junction circuit associated with the pair of chains comprising the chain into which said passive phase-shifter is integrated,
said first/second impedance circuit being configured to create an open circuit at the level of the connection point when the second inverter/first inverter is configured in its first configuration/second configuration.

4. The device of claim 1, wherein said at least one controlling module is configured to implement alternation between said at least two distinct modes according to a determined time scheme.

5. The device of claim 1, wherein said at least one controlling module is configured to implement alternation between said at least two distinct modes according to a dynamic time scheme.

6. The device of claim 1, wherein the power amplifier and the low-noise amplifier belonging to each pair of chains are configured so that the product of their respective gains is less than or equal to 1 when the device is configured according to the second mode.

7. The of claim 1, wherein the analog cancellation means are activated in the second mode.

8. The of claim 1, wherein said at least one controlling module is configured to control the switching means and to activate/deactivate the analog and digital interference cancellation means as well as all or part of the emission and reception chains, so that the device is able to alternate between the first mode, the second mode and at least one mode among:
a third mode in which the emission reception chains are activated/deactivated, the passive phase-shifters of the first set of passive phase-shifters being connected to their respective emission chains via their second port, and
a fourth mode in which the emission/reception chains are deactivated/activated, the passive phase-shifters of the second set of passive phase-shifters being connected to their respective reception chains via their second port.

9. A wireless communication system including:
a first wireless communication device configured to emit at least one transmission beam,
a second wireless communication device according to claim 1, able to reflect said at least one transmission beam in a determined direction when it is configured according to said second mode, and
a third wireless communication device configured to receive said at least one transmission beam reflected by said second communication device.

10. A method for controlling the operation of the wireless communication device claim 1, said method being implemented by said at least one controlling module of said wireless communication device, the method comprising controlling said wireless communication device such that said wireless communication device alternates between said at least two distinct modes by controlling the switching means and activating and/or deactivating the analog and digital interference cancellation means of said device as well as all or part of the emission and reception chains.

11. A communication method implemented by the wireless communication system of claim 9, the method comprising reflecting, by the second communication device when said second communication device is in said second mode, at least one transmission beam emitted by the first communication device, the reflected at least one transmission beam being received by the third communication device.

12. The method according to claim 11, wherein the second wireless communication device includes a plurality of passive phase-shifters distributed according to a first set of passive phase-shifters and a second set of passive phase-shifters, the phase-shifters of the first set of passive phase-shifters and the second set of passive phase-shifters being respectively connected to respective emission reception chains, said method comprising:
estimating a first propagation channel between the first and second communication devices,
determining, by the second communication device and according to the estimation of the first propagation channel, a first phase law able to configure the passive phase-shifters of said second set of passive phase-shifters so as to favor the reception of said at least one transmission beam emitted by the first communication device,
estimating a second propagation channel between the second and third communication devices,
determining, by the second communication device and according to the estimation of the second propagation channel, a second phase law able to configure the passive phase-shifters of said first set of passive phase-shifters so as to favor an emission of the transmission beam in the direction of said third communication device,
reflecting, by the second communication device configured in said second mode, said at least one transmission beam towards the third communication device, said first and second phase laws being applied simultaneously by respectively the passive phase-shifters of the second set of passive phase-shifters and the passive phase-shifters of the first set of passive phase-shifters.

* * * * *